United States Patent
Yoon et al.

(10) Patent No.: US 7,947,398 B2
(45) Date of Patent: May 24, 2011

(54) ELECTRODE FOR A SECONDARY BATTERY AND SECONDARY BATTERY COMPRISING THE SAME

(75) Inventors: Soo Jin Yoon, Gwangju-si (KR); Jeong Ju Cho, Daejeon (KR); Ho Chun Lee, Daejeon (KR)

(73) Assignee: LG Chem, Ltd. (KR)

( * ) Notice: Subject to any disclaimer, the term of this patent is extended or adjusted under 35 U.S.C. 154(b) by 978 days.

(21) Appl. No.: 11/779,576

(22) Filed: Jul. 18, 2007

(65) Prior Publication Data

US 2008/0020266 A1     Jan. 24, 2008

(30) Foreign Application Priority Data

Jul. 19, 2006   (KR) ........................ 10-2006-0067652

(51) Int. Cl.
  *H01M 6/18*       (2006.01)
(52) U.S. Cl. ......... 429/314; 429/307; 429/310; 429/317
(58) Field of Classification Search ................. 429/306, 429/307, 314, 317, 310
  See application file for complete search history.

(56) References Cited

U.S. PATENT DOCUMENTS

2004/0214092 A1   10/2004   Noh et al.

FOREIGN PATENT DOCUMENTS

| | | |
|---|---|---|
| CN | 1543006 A | 3/2004 |
| DE | 1 261 671 | 3/1962 |
| EP | 0 683 537 B1 | 1/1998 |
| GB | 904229 | 12/1959 |
| JP | 08-045545 | 2/1996 |
| JP | 2001-057233 | 2/2001 |
| JP | 2004-103433 | 4/2004 |
| KR | 1020040095852 A | 11/2004 |
| KR | 1020050029971 A | 3/2005 |
| KR | 1020030066271 | * 4/2006 |
| WO | 2007094625 | 8/2007 |

OTHER PUBLICATIONS

XP007911943.
XP007911944.
Supplemental European Report dated Mar. 8, 2010.
PCT International Search Report—Date of Mailing International Search Report Oct. 25, 2007.

* cited by examiner

*Primary Examiner* — Ula C. Ruddock
*Assistant Examiner* — Thomas H. Parsons
(74) *Attorney, Agent, or Firm* — Cantor Colburn LLP

(57) ABSTRACT

Disclosed is an electrolyte for a secondary battery comprising an electrolyte salt and an electrolyte solvent, the electrolyte further comprising a lactam-based compound substituted with an electron withdrawing group (EWG) at the nitrogen position thereof. The electrolyte allows formation of a firm and dense SEI film on the surface of an anode, minimizes irreversible oxidative decomposition at a cathode, and thus can provide a battery with significantly improved lifespan, stability and high temperature characteristics.

11 Claims, 1 Drawing Sheet

ELECTRODE FOR A SECONDARY BATTERY AND SECONDARY BATTERY COMPRISING THE SAME

This application claims the benefit of the filing date of Korean Patent Application No. 2006-67652, filed on Jul. 19, 2006, in the Korean Intellectual Property Office, the disclosure of which is incorporated herein in its entirety by reference.

TECHNICAL FIELD

The present invention relates to an electrolyte comprising a lactam-based compound capable of being reduced on an anode of a secondary battery to form a solid electrolyte interface film. More particularly, the present invention relates to an electrolyte, which is comprised of a lactam-based compound substituted with an electron withdrawing group (EWG) at the nitrogen position thereof and having an increased reduction potential.

BACKGROUND ART

Recently, as portable electronic instruments, such as portable computers, portable phones and camcorders, have been steadily developed so that they are downsized and lightened, lithium secondary batteries used as drive sources for the electronic instruments are also required to have a compact size and a light weight.

A lithium secondary battery includes a cathode, an anode and an electrolyte. Upon charge, lithium ions are deintercalated from a cathode active material. Then, the lithium ions are intercalated into an anode active material such as carbon particles, and are deintercalated from the anode active material upon discharge. In this manner, lithium ions transfer energy while they reciprocate between the cathode and the anode, thereby allowing the battery to be charged/discharged. However, quality of a lithium secondary battery may be degraded by the deterioration of an anode during repeated charge/discharge cycles. Also, when a battery is exposed to high temperature conditions, stability of the battery may be degraded by the gas generation in the battery.

To solve the aforementioned problems, EP 683537 and JP 08-45545 suggest a method for minimizing deterioration of an anode by using vinylene carbonate (referred to also as VC hereinafter) that forms a SEI film on an anode. However, the SEI film formed by VC shows a relatively high resistance and is decomposed with ease when exposed under high temperature conditions to generate gas such as carbon dioxide, resulting in degradation of the stability of a battery.

DISCLOSURE

It is an object of the present invention to examine an interrelation between the electron donating property of a substituent introduced to the nitrogen position of a lactam-based compound and the reduction/oxidation potential of the lactam-based compound.

It is another object of the present invention to examine that a battery shows different quality depending on the electron donating property of a substituent introduced to the nitrogen position of a lactam-based additive for an electrolyte, and thus to provide an electrolyte capable of improving the lifespan, stability and high-temperature characteristics of a secondary battery.

The present invention provides an electrolyte for a secondary battery comprising an electrolyte salt and an electrolyte solvent, the electrolyte further comprising a lactam-based compound substituted with an electron withdrawing group at the nitrogen position thereof. The present invention also provides a secondary battery including the same electrolyte.

Additionally, the present invention provides an electrode having a solid electrolyte interface film partially or totally formed on a surface thereof, the solid electrolyte interface film comprising a reduced form of a lactam-based compound substituted with an electron withdrawing group at the nitrogen position thereof. The present invention also provides a secondary battery including the same electrode.

Further, the present invention provides an additive for an electrolyte, which is comprised of a lactam-based compound capable of being reduced on an anode of a secondary battery to form a solid electrolyte interface film, the lactam-based compound being substituted with an electron withdrawing group at the nitrogen position thereof and having an increased reduction potential.

In addition to the above, the present invention provides a method for controlling the reduction potential or oxidation potential of a lactam-based compound by varying the electron donating property of a substituent introduced to the nitrogen position of the lactam-based compound.

BRIEF DESCRIPTION OF THE DRAWINGS

The foregoing and other objects, features and advantages of the present invention will become more apparent from the following detailed description when taken in conjunction with the accompanying drawing in which.

MODE FOR CARRYING OUT THE INVENTION

Figure 1:
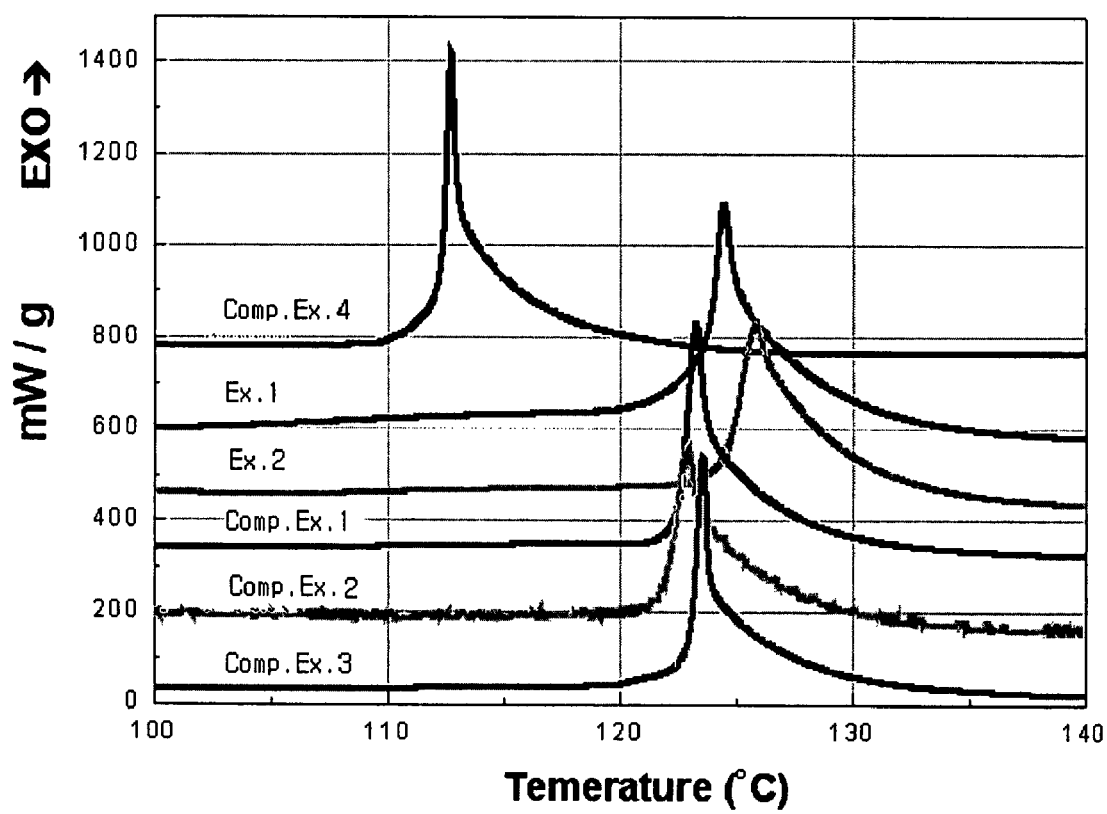
FIG. 1 is a graph showing the DSC (differential scanning calorimetry) results of the secondary batteries according to Examples 1 and 2 and Comparative Examples 1~4, the batteries including electrolytes each containing a lactam-based additive having a substituent with different electron donating property introduced to the nitrogen position thereof.

Hereinafter, the present invention will be explained in more detail.

In a lithium secondary battery, during the initial charge cycle, an anode active material may react with an electrolyte solvent on the surface of an anode to form a SEI (referred to also as SEI hereinafter) film. The SEI film formed as described above serves to prevent the electrolyte from being decomposed on the surface of the anode and to inhibit co-intercalation of an electrolyte solvent into the anode active material, and thus prevents structural collapse of the anode. However, SEI film formed by a conventional electrolyte solvent (e.g. a carbonate-based organic solvent) is weak, porous and coarse, and thus is easily decomposed by the electrochemical energy and heat energy increased during repeated charge/discharge cycles. Therefore, side reactions may continuously occur between the anode surface exposed due to the decomposition of the SEI film and the electrolyte surrounding the anode surface. Therefore, lithium ions are consumed continuously in a battery during repeated charge/discharge cycles, resulting in degradation of the capacity and cycle life characteristics of the battery. Additionally, because decomposition of the SEI film may be accelerated at high temperature, the battery shows poor high-temperature characteristics.

Meanwhile, it is known that a lactam-based compound can improve the quality of a battery at room temperature, when used as an additive for an electrolyte. However, since a lactam-based compound generally has a low oxidation potential, it may be easily decomposed via oxidation at the cathode of a battery during repeated charge/discharge cycles. Additionally, such oxidative decomposition of a lactam-based compound is irreversible and is prominent at a high temperature, so that the use of a lactam-based compound as an additive for an electrolyte may cause a problem of degradation of the stability and high-temperature characteristics of a battery. To solve this, many attempts are made to substitute a lactam-based compound with methyl or vinyl group or to vary the number of carbon atoms in the lactam ring. Despite such attempts, it has not been possible to solve the problem related to degradation of the stability and high-temperature characteristics of a battery.

Under these circumstances, the inventors of the present invention thought that electron density of the nitrogen atom in the lactam ring was an important factor affecting the reduction/oxidation potential of a lactam-based compound. Thus, the inventors of the present invention have studied to control the reduction/oxidation potential of a lactam-based compound by varying the electron donating property of a substituent introduced to the nitrogen position in the lactam ring so that the electron density of the nitrogen atom is increased or decreased.

When a lactam-based compound is substituted with an electron withdrawing group (referred to also as EWG hereinafter) so as to decrease the electron density of the nitrogen atom, the lactam-based compound may accept electrons more easily from the exterior but has increased difficulty in donating electrons to the exterior. Thus, the lactam-based compound with an EWG substituent shows an increased reduction/oxidation potential. Contrary to this, when a lactam-based compound is substituted with an electron donating group (referred to also as EDG hereinafter) at the nitrogen position thereof, the lactam-based compound shows a decreased reduction/oxidation potential (see the following Table 1). Herein, the reduction/oxidation potential is the potential based on Li$^+$/Li potential, and in a full cell, the reduction potential of lactam-based compound varies in reverse to the above when the electron donating property of a substituent introduced to the nitrogen position of lactam-based compound is varied.

Additionally, according to the examination of the inventors of the present invention, the quality of a secondary battery depends on the electron donating property of a substituent introduced to the nitrogen position of the lactam-based additive.

A lactam-based compound substituted with an EWG at the nitrogen position thereof has a higher reduction potential as compared to a lactam-based compound non-substituted or substituted with an EDG at the nitrogen position thereof. Thus, when used as an additive for an electrolyte in a secondary battery, the lactam-based compound substituted with an EWG at the nitrogen position thereof is reduced more easily, can form a SEI film more easily on the surface of an anode during the first charge cycle and can easily reproduce a new SEI film even when the original SEI film is decomposed due to the repetition of charge/discharge cycles. Therefore, the lactam-based additive substituted with an EWG at the nitrogen position thereof makes it possible to minimize a drop in the capacity of a battery caused by a drop in the amount of reversible lithium. Additionally, lactam-based additive substituted with an EWG at the nitrogen position thereof can form a firm and dense SEI film on the surface of an anode, so that it prevents degradation of the quality of a battery caused by deterioration of the anode. Ultimately, it is possible to improve the lifespan, high-temperature characteristics and stability of a battery (see the following Table 2).

Meanwhile, when a lactam-based compound non-substituted or substituted with an EDG at the nitrogen position thereof is used as an additive for an electrolyte, oxidative decomposition of such compounds is accelerated at a cathode due to the low oxidation potential of such compounds, resulting in degradation of the overall quality of a battery. On the contrary, a lactam-based compound substituted with an EWG at the nitrogen position thereof has a higher oxidation potential than a lactam-based compound non-substituted or substituted with an EDG at the nitrogen position thereof due to the electron withdrawing activity of the EWG. Thus, when using the lactam-based compound substituted with an EWG is used as an additive for an electrolyte, oxidative decomposition of the lactam-based compound is lowered at a cathode, resulting in improvements in the lifespan, stability and high-temperature characteristics of a battery (see Tables 1 and 2).

Therefore, the present invention is characterized by using a lactam-based compound substituted with an EWG at the nitrogen position thereof and having a relatively high reduction/oxidation potential as an additive for an electrolyte. By virtue of this, it is possible to form a firm and dense SEI film on the surface of an anode, to minimize irreversible oxidative decomposition of the lactam-based additive at a cathode, and to improve the lifespan, stability and high-temperature characteristics of a battery.

Herein, there is no particular limitation in the EWG present as a substituent at the nitrogen atom of a lactam-based compound used as an additive for an electrolyte according to the present invention, as long as the EWG has electron affinity and is capable of electron withdrawing. It is preferable that the EWG is an atomic group having a Hammett substituent constant ($\sigma_p$) greater than 0. A larger Hammett substituent constant ($\sigma_p$) is more preferred. (R. Jones, "Physical and Mechanistic Organic Chemistry", p. 35, Cambridge University Press, 1979; J. March, "Advanced Organic Chemistry", 3rd ed., Chap. 9, John Wiley and Sons, 1985). Non-limiting examples of the EWG that may be used in the present invention include cyano group (CN), nitro group ($NO_2$), methanesulfonyl group ($SO_2CH_3$), phenylsulfonyl group ($SO_2Ph$), trifluoromethanesulfonyl group ($SO_2CF_3$), pentafluoroethanesulfonyl group ($SO_2C_2F_5$), pentafluorophenyl group ($C_6F_5$), acetyl group ($COCH_3$), ethyl ketone group ($COC_2H_5$), methyl ester group ($COOCH_3$), or the like.

The lactam-based compound substituted with an EWG at the nitrogen position thereof, which can be used as an additive for an electrolyte according to the present invention, may be represented by the following Formula 1:

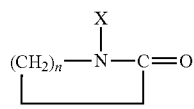

[Formula 1]

wherein n is a number of 3~11, and X is an electron withdrawing group (EWG).

Although the lactam-based compound substituted with an EWG at the nitrogen position thereof may be used in an electrolyte for a secondary battery in a controlled amount to improve the overall quality of the battery, it is used preferably in an amount of 0.05~10 parts by weight based on 100 parts by weight of the electrolyte. If the compound is used in an amount less than 0.05 parts by weight, it is not possible to sufficiently improve the lifespan, stability and high temperature characteristics of a battery. On the other hand, if the compound is used in an amount greater than 10 parts by weight, capacity or ion conductivity of a battery decreases or viscosity of the electrolyte increases due to a surplus amount of the lactam-based compound, so that the battery may be degraded in terms of its overall quality.

The electrolyte for a battery, to which the lactam-based compound is added, comprises conventional components widely known to one skilled in the art, for example, an electrolyte salt and an electrolyte solvent.

The electrolyte salt that may be used in the present invention includes a salt represented by the formula of $A^+B^-$, wherein $A^+$ represents an alkali metal cation selected from the group consisting of $Li^+$, $Na^+$, $K^+$ and combinations thereof, and $B^-$ represents an anion selected from the group consisting of $PF_6^-$, $BF_4^-$, $Cl^-$, $Br^-$, $I^-$, $ClO_4^-$, $AsF_6^-$, $CH_3CO_3^-$, $N(CF_3SO_2)_2^-$, $C(CF_2SO_2)_3^-$ and combinations thereof. A lithium salt is particularly preferred.

The electrolyte solvent that may be used in the present invention includes conventional solvents known to those skilled in the art, such as cyclic carbonates and/or linear carbonates. Non-limiting examples of the electrolyte solvents include propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethyoxyethane, tetrahydrofuran, N-methyl-2-pyrrolidone (NMP), ethyl methyl carbonate (EMC), gamma-butyrolactone (GBL), fluoroethylene carbonate (FEC), methyl formate, ethyl formate, propyl formate, methyl acetate, ethyl acetate, propyl acetate, pentyl acetate, methyl propionate, ethyl propionate, propyl propionate, butyl propionate or a mixture thereof. Halogen derivatives of the above electrolyte solvents may also be used.

Additionally, the present invention provides an electrode (preferably an anode), which includes a SEI film partially or totally formed on the surface thereof, the SEI film comprising a reduced form of the lactam-based compound substituted with an EWG at the nitrogen position thereof. The electrode can be obtained by subjecting to at least one charge/discharge cycle after assembling a unit cell using an electrode manufactured by a conventional method known to one skilled in the art and an electrolyte comprising the lactam-based compound substituted with an EWG at the nitrogen position thereof, so that a SEI film can be formed on the surface of the electrode active material. In a variant, before assembling a unit cell, an electrode manufactured by a conventional method known to one skilled in the art is subjected to electrical reduction while the electrode is dipped into an electrolyte comprising the lactam-based compound substituted with an EWG at the nitrogen position thereof, so as to obtain an electrode having a preliminarily formed SEI film thereon.

The electrode having no SEI film can be obtained by a conventional method known to one skilled in the art. In one embodiment of such conventional methods, electrode slurry is prepared by mixing and agitating an electrode active material and a solvent optionally with a binder, a conductive agent and a dispersant, and then the slurry is applied (coated) onto a metallic current collector, followed by compressing and drying.

Anode active materials may include any conventional anode active materials currently used in an anode of a conventional secondary battery. Particular non-limiting examples of the anode active material include lithium intercalation materials such as lithium metal, lithium alloys, carbon, petroleum coke, activated carbon, graphite or other carbonaceous materials. Non-limiting examples of an anode current collector include foil formed of copper, gold, nickel, copper alloys or a combination thereof.

Further, the secondary battery according to the present invention includes an electrolyte comprising a lactam-based compound substituted with an EWG at the nitrogen position thereof, and/or an electrode having a SEI film partially or totally formed on the surface thereof, the SEI film comprising a reduced form of the lactam-based compound substituted with an EWG at the nitrogen position thereof. Preferably, the present invention provides a secondary battery comprising: a separator; a cathode; an anode having a SEI film partially or totally formed on the surface thereof, the SEI film comprising a reduced form of the lactam-based compound substituted with an EWG at the nitrogen position thereof; and/or an electrolyte comprising a lactam-based compound substituted with an EWG at the nitrogen position thereof.

Preferably, the secondary battery is a lithium secondary battery, and non-limiting examples of the lithium secondary battery include a lithium metal secondary battery, a lithium ion secondary battery, a lithium polymer secondary battery or a lithium ion polymer secondary battery.

Particularly, cathode active materials may include any conventional cathode active materials currently used in a cathode of a conventional secondary battery. Particular non-limiting examples of the cathode active material include: lithium transition metal composite oxides, including $LiM_xO_y$ (wherein M=Co, Ni, Mn, $Co_aNi_bMn_c$), such as lithium manganese composite oxides (e.g. $LiMn_2O_4$), lithium nickel oxides (e.g. $LiNiO_2$), lithium cobalt oxides (e.g. $LiCoO_2$), or other oxides containing other transition metals partially substituting for manganese, nickel and cobalt; chalcogenide (e.g. manganese dioxide, titanium disulfide, molybdenum disulfide, etc.); or the like. Among these examples, $LiCoO_2$, $LiNiO_2$, $LiMnO_2$, $LiMn_2O_4$, $Li(Ni_aCo_bMn_c)O_2$ (wherein $0<a<1$, $0<b<1$, $0<c<1$, $a+b+c=1$), $LiNi_{1-y}Co_yO_2$, $LiCo_{1-y}Mn_yO_2$, $LiNi_{1-y}Mn_yO_2$ (wherein $0<Y<1$), $Li(Ni_aCo_bMn_c)O_4$ ($0<a<2$, $0<b<2$, $0<c<2$, $a+b+c=2$), $LiMn_{2-z}Ni_zO_4$, $LiMn_{2-z}Co_zO_4$ (wherein $0<Z<2$), $LiCoPO_4$, $LiFePO_4$ or a mixture thereof is particularly preferred. Non-limiting examples of a cathode current collector include foil formed of aluminum, nickel or a combination thereof.

Preferably, the separator is a porous separator. Non-limiting examples of the separator that may be used include a polypropylene-based, polyethylene-based or polyolefin-based separator.

The secondary battery according to the present invention may be obtained by using a method generally known to one skilled in the art. For example, an electrode assembly is formed by using a cathode, an anode and a separator interposed between both electrodes, and then an electrolyte containing the above-described lactam-based compound is injected thereto.

There is no particular limitation in the outer shape of the secondary battery obtained in the above-described manner. The secondary battery may be a cylindrical, prismatic, pouch-type or coin-type battery.

Further, the present invention provides an additive for an electrolyte, which is comprised of a lactam-based compound capable of being reduced on the anode of a secondary battery to form a SEI film, the lactam-based compound being substituted with an EWG at the nitrogen position thereof and having an increased reduction potential.

In addition to the above, the present invention provides a method for controlling the reduction potential or oxidation potential of a lactam-based compound by varying the electron donating property of a substituent introduced to the nitrogen position of the lactam-based compound. For example, it is possible to increase the reduction potential or oxidation potential of the lactam-based compound by using an EWG as the substituent so as to decrease the electron density at the nitrogen atom in the lactam ring. Also, it is possible to control the reduction potential or oxidation potential of the lactam-based compound more precisely by adjusting the electron withdrawing degree of the substituent on the basis of a unique Hammett substituent constant ($\sigma_p$) different from one atomic group to another atomic group.

Reference will now be made in detail to the preferred embodiments of the present invention. It is to be understood that the following examples are illustrative only and the present invention is not limited thereto.

Example 1

1M LiPF$_6$ dissolved in a mixed solvent of ethylene carbonate (EC):ethylmethyl carbonate (EMC) (3:7 on the volume basis) was used as an electrolyte, and N-trifluoromethyl caprolactam represented by the following Formula 2 was added to the electrolyte in an amount of 1.0 wt %:

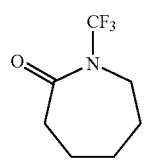

[Formula 2]

Artificial graphite was used as a cathode and lithium metal foil was used as an anode to provide a coin-like half-cell in a conventional manner. The electrolyte obtained as described above was also used in the half-cell.

Example 2

An electrolyte and a secondary battery were obtained in the same manner as described in Example 1, except that N-methylsulfonyl caprolactam represented by the following formula 3 was used instead of N-trifluoromethyl caprolactam:

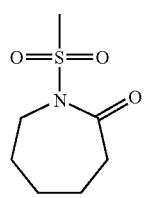

[Formula 3]

Comparative Example 1

An electrolyte and a secondary battery were obtained in the same manner as described in Example 1, except that ε-caprolactam represented by the following Formula 4 was used instead of N-trifluoromethyl caprolactam:

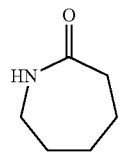

[Formula 4]

Comparative Example 2

An electrolyte and a secondary battery were obtained in the same manner as described in Example 1, except that N-methyl caprolactam represented by the following Formula 5 was used instead of N-trifluoromethyl caprolactam:

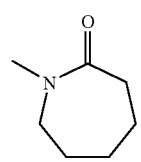

[Formula 5]

Comparative Example 3

An electrolyte and a secondary battery were obtained in the same manner as described in Example 1, except that N-vinyl caprolactam represented by the following Formula 6 was used instead of N-trifluoromethyl caprolactam:

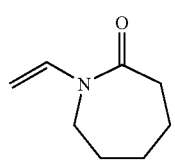

[Formula 6]

Comparative Example 4

An electrolyte and a secondary battery were provided in the same manner as described in Example 1, except that no additive was used in 1M LiPF$_6$ solution.

Experimental Example 1

Comparison of Electron Donating Properties of Lactam-Based Compounds

The Hammett substituent constant ($\sigma_p$) of each substituent of the lactam-based compound according to the present invention is shown in the following Table 1. (R. Jones, "Physical and Mechanistic Organic Chemistry", p. 35, Cambridge University Press, 1979; J. March, "Advanced Organic Chemistry", 3rd ed., Chap. 9, John Wiley and Sons, 1985).

In Table 1, each of trifluoromethyl group (Ex. 1) and methylsulfonyl group (Ex. 2) has a positive Hammett substituent constant ($\sigma_p$) and functions as an EWG, while each of methyl group (Comp. Ex. 2) and vinyl group (Comp. Ex. 3) has a negative Hammett substituent constant and functions as an EDG. Meanwhile, hydrogen (Comp. Ex. 1) has a Hammett substituent constant of zero.

Experimental Example 2

Comparison of Reduction Voltages of Electrolytes Containing Lactam-Based Compounds Each of the coin-like half cells, obtained according to Examples 1 and 2 and Comparative Examples 1~4, was discharged at 0.1 C to 5 mV. Then, a dQ/dV plot was constructed based on the results of the experiment. The peak reduction voltage of each half-cell is shown in Table 1.

After the experiment, each of the half cells using a lactam-based compound substituted with an EWG at the nitrogen position thereof as an electrolyte additive according to Examples 1 and 2 shows the highest reduction voltage. On the contrary, each of the half cells using a lactam-based compound substituted with an EDG at the nitrogen position thereof as an electrolyte additive according to Comparative Examples 2 and 3 shows the lowest reduction voltage. Additionally, the half-cell using a lactam-based compound having no substituent at the nitrogen position thereof as an electrolyte additive according to Comparative Example 1 shows a moderate reduction voltage (see Table 1). Therefore, it can be seen from the above results that the electron donating property of a substituent introduced to the nitrogen position of a lactam-based compound has a close interrelation with the reduction potential of the same compound.

Experimental Example 3

Comparison of Initial Oxidation Voltages of Electrolytes Containing Lactam-Based Compounds Each of the electrolytes according to Examples 1 and 2 and Comparative Examples 1~4 was subjected to linear sweep voltammetry. The initial oxidation voltage measured from each electrolyte is shown in Table 1. Herein, the initial oxidation voltage is defined as the voltage when oxidation current reaches 0.1 mA/cm$^2$. A Pt circular electrode was used as a working electrode, lithium metal was used as a reference electrode and a Pt linear electrode was used as a supplementary electrode. The scanning rate was set to 20 mV/s. The initial oxidation voltage was determined in a glove box under argon (Ar) atmosphere containing 10 ppm or less of moisture and oxygen.

After the experiment, it can be seen that each of the electrolytes using a lactam-based compound as an electrolyte additive according to Examples 1 and 2 and Comparative Examples 1~3 shows a lower initial oxidation potential as compared to the electrolyte using no additive according to Comparative Example 4 (see Table 1). Thus, it can be seen from the above results that addition of a lactam-based compound to an electrolyte facilitates oxidative decomposition of an electrolyte at a cathode as compared to an electrolyte to which no additive was used.

Meanwhile, each of the electrolytes using a lactam-based compound substituted with an EWG at the nitrogen position thereof as an electrolyte additive according to Examples 1 and 2 shows the highest oxidation voltage. On the contrary, each of the electrolytes using a lactam-based compound substituted with an EDG at the nitrogen position thereof as an electrolyte additive according to Comparative Examples 2 and 3 shows the lowest oxidation voltage. Additionally, the electrolyte using a lactam-based compound having no substituent at the nitrogen position thereof as an electrolyte additive according to Comparative Example 1 shows a moderate oxidation voltage (see Table 1). Therefore, it can be seen from the above results that the electron donating property of a substituent introduced to the nitrogen position of a lactam-based compound has a close interrelation with the oxidation potential of the same compound. Particularly, a lactam-based compound substituted with an EWG at the nitrogen position thereof has a higher oxidation potential. Thus, it can be estimated that addition of such compounds to an electrolyte decreases oxidative decomposition of the electrolyte at a cathode.

TABLE 1

| Electrolyte additive | Substituent | Hammett substituent constant ($\sigma_p$) | Peak reduction voltage (V vs. Li) | Initial oxidation voltage (V vs. Li) |
|---|---|---|---|---|
| Ex. 1 | N-trifluoro methyl caprolactam | Trifluoro methyl (CF$_3$) | 0.53 | 0.92 | 5.20 |
| Ex. 2 | N-methyl sulfonyl caprolactam | Methyl sulfonyl (SO$_2$CH$_3$) | 0.73 | 1.05 | 5.33 |
| Comp. Ex. 1 | ε-caprolactam | None (H) | 0 | 0.64 | 5.05 |
| Comp. Ex. 2 | N-methyl caprolactam | methyl (CH$_3$) | −0.17 | 0.57 | 4.77 |
| Comp. Ex. 3 | N-vinyl caprolactam | vinyl (CH=CH$_2$) | −0.02 | 0.52 | 4.27 |
| Comp. Ex. 4 | None | — | — | 0.48 | 5.91 |

Experimental Example 4

Evaluation of Quality of Lithium Secondary Battery

Each of the coin-like half cells according to Examples 1 and 2 and Comparative Examples 1~4 was subjected to fifty charge/discharge cycles under a temperature of 23° C. and 60° C. at a current of 0.5 C. The results are shown in the following Table 2.

TABLE 2

| | | 23° C. Test | | | 60° C. Test | | |
|---|---|---|---|---|---|---|---|
| | Additive | First cycle | 50$^{th}$ cycle | Maintenance of life-span (%) | First cycle | 50$^{th}$ cycle | Maintenance of life-span (%) |
| Ex. 1 | N-trifluoro methyl caprolactam | 4.98 | 4.68 | 94.0 | 5.20 | 4.75 | 91.3 |
| Ex. 2 | N-methyl sulfonyl caprolactam | 4.95 | 4.71 | 95.2 | 5.18 | 4.84 | 93.4 |
| Comp. Ex. 1 | ε-caprolactam | 5.07 | 4.55 | 89.7 | 4.85 | 3.90 | 80.4 |
| Comp. Ex. 2 | N-methyl caprolactam | 4.78 | 3.92 | 82.0 | 4.72 | 3.68 | 78.0 |
| Comp. Ex. 3 | N-vinyl caprolactam | 5.23 | 2.84 | 54.3 | 4.81 | 3.12 | 64.9 |
| Comp. Ex. 4 | None | 5.06 | 3.85 | 76.1 | 4.87 | 3.63 | 75.5 |

After the experiment, each of the batteries using a lactam-based compound substituted with an EWG at the nitrogen position thereof as an electrolyte additive according to Examples 1 and 2 shows the highest maintenance of lifespan at room temperature (23° C.) as well as at a high temperature (60° C.). However, each of the batteries using a lactam-based compound substituted with an EDG at the nitrogen position thereof as an electrolyte additive according to Comparative Examples 2 and 3 shows the lowest maintenance of lifespan. Also, the battery using a lactam-based compound having no substituent at the nitrogen position thereof as an electrolyte additive according to Comparative Example 1 shows a high maintenance of lifespan at room temperature (23° C.), but shows a lower maintenance of lifespan at a high temperature (60° C.) as compared to the batteries using a lactam-based compound substituted with an EWG at the nitrogen position thereof as an electrolyte additive according to Examples 1 and 2.

Therefore, it can be seen from the above results that the electron donating property of a substituent introduced to the nitrogen position of a lactam-based compound has a close interrelation with the lifespan and quality of a battery at room temperature/high temperature. Particularly, it can be seen that the battery using a lactam-based compound substituted with an EWG at the nitrogen position thereof as an electrolyte additive shows excellent lifespan and high-temperature characteristics as compared to each of the batteries using a lactam-based compound having no substituent or substituted with an electron donating group at the nitrogen position thereof as an electrolyte additive. It is thought that this results from the fact that the use of a lactam-based compound substituted with an EWG at the nitrogen position thereof as an electrolyte additive increases the reduction potential and oxidation potential so as to facilitate formation of a SEI film on an anode and to decrease irreversible oxidative decomposition at a cathode.

Additionally, the battery of Example 2 using the electrolyte containing a lactam-based compound substituted with methansulfonyl group ($SO_2CH_3$) having a relatively high Hammett substituent constant ($\sigma_p$) (i.e. electron withdrawing degree) at the nitrogen position thereof shows more excellent quality as compared to the battery of Example 1 using the electrolyte containing a lactam-based compound substituted with trifluoromethyl group ($CF_3$) having a relatively low Hammett substituent constant ($\sigma_p$) (i.e. electron withdrawing degree) at the nitrogen position thereof. This indicates that a higher Hammett substituent constant (i.e. electron withdrawing degree) of a substituent introduced to the nitrogen position of a lactam-based additive results in a higher degree of improvement in the lifespan, high-temperature characteristics and stability of a battery.

Experimental Example 5

Each of the coin-like half cells obtained from Examples 1 and 2, and Comparative Examples 1~4 was subjected to three times of charge/discharge cycles under 0.2 C at 23° C., each cell was disassembled, and then the anode was collected from each cell in a discharged state. The anode was analyzed by DSC (differential scanning calorimetry). The results are shown in FIG. 1 and the following Table 3. It is generally thought that the heat emission peak appearing in FIG. 1 and Table 3 is the result of the thermal decomposition of the SEI film on the surface of the anode.

Exothermic behavior of an anode varies depending on the kind of the additive used in each of the electrolytes according to Examples 1 and 2 and Comparative Examples 1~4 (see FIG. 1 and Table 3). It can be seen from the above experimental results that the lactam-based compound substituted with an EWG at the nitrogen position thereof, which is used as an additive for electrolyte according to the present invention, participates in the formation of the SEI film on an anode.

In addition, each of the batteries using a lactam-based compound substituted with an EWG at the nitrogen position thereof as an electrolyte additive according to Examples 1 and 2 shows a higher heat emission peak temperature, as compared to each of the batteries using a lactam-based compound having no substituent or substituted with an electron donating group at the nitrogen position thereof as an electrolyte additive according to Comparative Examples 1~3 (see FIG. 1 and Table 3). It is generally thought that a higher heat emission peak temperature in a DSC graph demonstrates more excellent thermal stability of the SEI film formed on the surface of an anode. Therefore, it can be seen that the SEI film formed by the lactam-based compound substituted with an EWG at the nitrogen position thereof according to the present invention shows excellent thermal stability.

TABLE 3

| | Electrolyte additive | Heat emission peak temperature (° C.) |
|---|---|---|
| Ex. 1 | N-trifluoromethyl caprolactam | 124.6 |
| Ex. 2 | N-methylsulfonyl caprolactam | 125.9 |
| Comp. Ex. 1 | ε-caprolactam | 123.2 |
| Comp. Ex. 2 | N-methyl caprolactam | 122.9 |
| Comp. Ex. 3 | N-vinyl caprolactam | 123.6 |
| Comp. Ex. 4 | None | 112.8 |

INDUSTRIAL APPLICABILITY

As can be seen from the foregoing, the use of a lactam-based compound, which is substituted with an EWG at the nitrogen position thereof and has an increased reduction potential, as an additive for an electrolyte of a secondary battery allows formation of a firm and dense SEI film on the surface of an anode, minimizes irreversible oxidative decomposition at a cathode, and thus can provide a battery with significantly improved lifespan, stability and high temperature characteristics.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. An electrolyte for a secondary battery comprising an electrolyte salt and an electrolyte solvent, the electrolyte further comprising a lactam-based compound substituted with an electron withdrawing group (EWG) at a nitrogen position thereof, wherein the electron withdrawing group is selected from the group consisting of cyano group (CN), nitro group ($NO_2$), methanesulfonyl group ($SO_2CH_3$), phenylsulfonyl group ($SO_2Ph$), trifluoromethanesulfonyl group ($SO_2CF_3$), pentafluoroethanesulfonyl group ($SO_2C_2F_5$), pentafluorophenyl group ($C_6F_5$), ethyl ketone group ($COC_2H_5$), trifluoromethyl group and methyl ester group ($COOCH_3$).

2. The electrolyte for a secondary battery as claimed in claim 1, wherein the lactam-based compound is a compound capable of being reduced on a surface of an anode of a secondary battery to form a solid electrolyte interface (SEI) film, and has an increased reduction potential due to the EWG substituent at the nitrogen position.

3. The electrolyte for a secondary battery as claimed in claim 1, wherein the lactam-based compound has an increased oxidation potential due to the EWG substituent at the nitrogen position.

4. The electrolyte for a secondary battery as claimed in claim 1, wherein the lactam-based compound substituted with an electron withdrawing group at the nitrogen position is used in an amount of 0.05~10 parts by weight based on 100 parts by weight of the electrolyte.

5. A secondary battery comprising a cathode, an anode and an electrolyte as defined in claim 1, wherein the electrolyte comprises a lactam-based compound substituted with an electron withdrawing group (EWG) at a nitrogen position thereof, wherein the electron withdrawing group is selected from the group consisting of cyano group (CN), nitro group ($NO_2$), methanesulfonyl group ($SO_2CH_3$), phenylsulfonyl group ($SO_2Ph$), trifluoromethanesulfonyl group ($SO_2CF_3$), pentafluoroethanesulfonyl group ($SO_2C_2F_5$), pentafluorophenyl group ($C_6F_5$), ethyl ketone group ($COC_2H_5$), trifluoromethyl group and methyl ester group ($COOCH_3$).

6. The secondary battery as claimed in claim 5, wherein the lactam-based compound is a compound capable of being reduced on a surface of an anode of a secondary battery to form a solid electrolyte interface (SEI) film, and has an increased reduction potential due to the EWG substituent at the nitrogen position.

7. The secondary battery as claimed in claim 5, wherein the lactam-based compound has an increased oxidation potential due to the EWG substituent at the nitrogen position.

8. The secondary battery as claimed in claim 5, wherein the lactam-based compound substituted with an electron withdrawing group at the nitrogen position is used in an amount of 0.05~10 parts by weight based on 100 parts by weight of the electrolyte.

9. The secondary battery as claimed in claim 5, wherein a cathode and/or an anode is an electrode comprising a solid electrolyte interface (SEI) film partially or totally formed on a surface thereof, the SEI film being a reduced form of a lactam-based compound substituted with an electron withdrawing group at a nitrogen position thereof, wherein the electron withdrawing group is selected from the group consisting of cyano group (CN), nitro group ($NO_2$), methanesulfonyl group ($SO_2CH_3$), phenylsulfonyl group ($SO_2Ph$), trifluoromethanesulfonyl group ($SO_2CF_3$), pentafluoroethanesulfonyl group ($SO_2C_2F_5$), pentafluorophenyl group ($C_6F_5$), ethyl ketone group ($COC_2H_5$), trifluoromethyl group and methyl ester group ($COOCH_3$).

10. A method for controlling a reduction potential or oxidation potential of a lactam-based compound, the method comprising,
varying an electron donating property of a substituent introduced to a nitrogen position of the lactam-based compound, wherein the substituent is selected from the group consisting of cyano group (CN), nitro group ($NO_2$), methanesulfonyl group ($SO_2CH_3$), phenylsulfonyl group ($SO_2Ph$), trifluoromethanesulfonyl group ($SO_2CF_3$), pentafluoroethanesulfonyl group ($SO_2C_2F_5$), pentafluorophenyl group ($C_6F_5$), ethyl ketone group ($COC_2H_5$), trifluoromethyl group and methyl ester group ($COOCH_3$).

11. The method as claimed in claim 10, wherein the method is for increasing a reduction potential or oxidation potential of the lactam-based compound by using an electron withdrawing group (EWG) as the substituent introduced to a nitrogen position of the lactam-based compound.

* * * * *